(12) United States Patent
Yamamoto et al.

(10) Patent No.: US 7,830,474 B2
(45) Date of Patent: Nov. 9, 2010

(54) LIGHTING DEVICE AND LIQUID CRYSTAL DISPLAY USING IT

(75) Inventors: Tsunenori Yamamoto, Hitachi (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 11/621,255

(22) Filed: Jan. 9, 2007

(65) Prior Publication Data

US 2008/0018827 A1  Jan. 24, 2008

(30) Foreign Application Priority Data

Jan. 10, 2006 (JP) ............................. 2006-002293

(51) Int. Cl.
  *G02F 1/1335* (2006.01)
(52) U.S. Cl. .......................... 349/62; 349/66
(58) Field of Classification Search .................. 349/62, 349/64, 65, 66; 362/26, 97.2–97.3, 606, 362/609, 927

See application file for complete search history.

(56) References Cited

U.S. PATENT DOCUMENTS

| 5,029,986 A * | 7/1991 | De Vaan ..................... 349/113 |
| 7,438,429 B2 * | 10/2008 | Matsushita ................. 362/97.1 |
| 2003/0063233 A1 * | 4/2003 | Takagi ......................... 349/65 |

FOREIGN PATENT DOCUMENTS

| JP | 08-122782 | 5/1996 |
| JP | 08-201803 | 8/1996 |
| JP | 09-236803 | 9/1997 |
| JP | 10-241434 | 9/1998 |
| JP | 2000-171614 | 6/2000 |
| JP | 2001-133782 | 5/2001 |
| JP | 2001-235741 | 8/2001 |
| JP | 2001-318614 | 11/2001 |
| JP | 2002-182208 | 6/2002 |
| JP | 2003-279979 | 10/2003 |
| JP | 2004-152515 | 5/2004 |

(Continued)

*Primary Examiner*—James A Dudek
(74) *Attorney, Agent, or Firm*—Antonelli, Terry, Stout & Kraus, LLP.

(57) ABSTRACT

A lighting device for emitting light in a planar manner comprises a backlight section having non-uniformity in light emission in a plane and an optical film having an in-plane transmittance distribution compensating for the non-uniformity in light emission. The optical film has a plurality of slits allowing light to pass through and controls the in-plane transmittance distribution by varying the shapes of slit openings. Widths of the slits are fixed, closed portions are provided in a longitudinal direction, and the in-plane transmittance distribution is controlled by the ratio of the closed portions to the slits. A part of the optical film other than the slits is a light shielding layer, and a surface on the light source side of the light shielding layer scatters and reflects light. Each value in the in-plane transmittance distribution of the optical film is smaller than the reciprocal of a corresponding value in a light intensity distribution of the backlight section. A surface opposite to a surface on the light source side of the optical film has a cylindrical lens structure focused on the slits. Non-uniformity in light emission in the lighting device such as a backlight used in a liquid crystal display is eliminated at a low cost.

17 Claims, 9 Drawing Sheets

FOREIGN PATENT DOCUMENTS

| | | |
|---|---|---|
| JP | 2004-191675 | 7/2004 |
| JP | 2004-279864 | 10/2004 |
| JP | 2005-043907 | 2/2005 |
| JP | 2005-122121 | 5/2005 |
| JP | 2005-128561 | 5/2005 |
| JP | 2005-208425 | 8/2005 |
| JP | 2005-221619 | 8/2005 |
| JP | 2005-321693 | 11/2005 |
| JP | 2005-331804 | 12/2005 |
| JP | 2005-339881 | 12/2005 |

* cited by examiner

LIGHTING DEVICE AND LIQUID CRYSTAL DISPLAY USING IT

INCORPORATION BY REFERENCE

The present application claims priority from Japanese application JP2006-002293 filed on Jan. 10, 2006, the content of which is hereby incorporated by reference into this application.

BACKGROUND OF THE INVENTION

The present invention relates to a liquid crystal display which has a good display quality and is low-cost.

Conventional liquid crystal displays will be explained below. Although CRTs had been the mainstream of displays, active matrix-type liquid crystal displays (hereinafter referred to as LCDs) have been becoming prevalent in these years. The LCD is a display which utilizes the light transmittance of a liquid crystal, and does not emit light by itself. The LCD produces a gray scale display by controlling the emission of a backlight provided on the back among a light-transmitting state, a light-blocking state, and an intermediate state between the two states.

The backlight on the back uses, as a light source, a cold cathode tube (a type of fluorescent lamp, hereinafter referred to as a CCFL) which is a line light source, or a light emitting element (hereinafter referred to as an LED) which is a point light source. The backlight spreads light emitted from the tube or element in a two-dimensional plane as uniform as possible and serves as a plane illuminant.

Available light source arrangements include a bottom emitting type which uses light sources while arranging them immediately below a plane, and an edge emitting type arrangement which arranges light sources at edges of a plane and guides light in a planar manner.

In the bottom emitting type arrangement, efficiency for light utilization is generally high, and a large number of light sources can be arranged. Accordingly, the quantity of emitted light can be increased. However, to suppress non-uniformity in light emission from the line light sources such as the CCFLs or the point light sources such as the LEDs and make the light emission uniform, it is necessary to arrange a light diffuser or the like at a certain distance from the light sources, and install a light scattering sheet or the like around the light sources to make the light emission uniform by light scattering. For this reason, the backlight needs to have a moderately large thickness.

On the other hand, in the edge emitting type arrangement, linear light sources are arranged at an edge section, and light is guided in a direction perpendicular to a light emitting plane and made uniform. This allows a reduction in the thickness of the backlight. However, since efficiency for light utilization is low, and the number of light sources which can be arranged is limited in order to reduce the thickness, the quantity of emitted light decreases.

In currently used LCDs, an LCD for a notebook computer or one as a monitor for a desktop computer mainly adopts the edge emitting type arrangement in terms of portability and setting. In contrast, an LCD used as a television receiver, i.e., so-called liquid crystal television adopts the bottom emitting type arrangement because a large quantity of light is required.

As described above, most of the existing backlights use the line light sources or point light sources as an illuminant. To use them as a maximally-uniform two-dimensional plane illuminant, light is scattered in space and made uniform. As a result, light beams emitted from a light emitting plane have a high degree of scattering, and directions in which the light beams are emitted are not the same.

It is desirable for a user of an LCD, however, that the brightness of the LCD be intense in the front where the user mainly uses the LCD and that light be condensed in a direction perpendicular to a plane as the emitting direction of light from the backlight.

For this reason, an optical sheet with a light condensing ability such as a prism sheet or an optical sheet having a lens structure as described in JP-A-10-241434 is often used above the light emitting side of a light scattering plate in the case of the bottom emitting type arrangement or on the light emitting side of a light guide plate which guides light in the case of the edge emitting type arrangement.

Examples of future improvement in the performance of a backlight include use of primary color LEDs which can enhance color reproductivity, improvement in a light emitting method for remedying motion artifacts in an LCD, and a reduction in cost.

LEDs are now mainly used as backlights of small and medium-sized LCDs. These LEDs are white LEDs using a combination of a blue LED or the like and a fluorescent substance. On the other hand, an LED backlight which uses the RGB primary colors is expected to be mainly used in a liquid crystal television and can enhance color reproductivity and represent deep red and green.

To use LEDs as the backlight of a liquid crystal television, as a large quantity of light is required, it is necessary to use a large number of primary color LEDs. In this case, the LED backlight inevitably has the bottom emitting type configuration. However, since there are wide variations in light emitting property among existing LEDs, and LEDs which are a point light source are used in the bottom emitting type configuration in which a distance for scattering and uniformization of light is short, non-uniformity in light emission is highly likely to occur.

In order to avoid this, in the backlight of a commercially available liquid crystal television which uses the primary color LEDs, the distance between the LED illuminant and a scattering plate is long, and one more scatting plate is installed between the LED illuminant and the scattering plate.

Non-uniformity in light emission also occurs if a light emission area of a backlight is divided into areas to allow the areas to individually emit light for the purpose of improving the moving picture quality of an LCD, and a partition-like structure is provided to limit light from the respective areas, as described in JP-A-2001-318614. Similarly, a reduction in the number of light sources such as a CCFL and LED for a lower cost causes non-uniformity.

Examples of means for eliminating non-uniformity in light emission in a backlight as described above without increasing the thickness of the backlight include a method for varying the transmittance of a scattering plate from one point to another as described in JP-A-2002-182208 and a method for laying two scattering plates on top of another as described in JP-A-2001-318614.

In the meantime, the prices for displays using LCDs, i.e., notebook computers, liquid crystal monitors, liquid crystal televisions and the like are now rapidly falling. Accordingly, a reduction in the cost of an LCD is an urgent necessity.

To fabricate a scattering plate with an in-plane transmittance distribution as described in JP-A-2002-182208, it is necessary to seamlessly join sections with different concentration distributions or solidify the scattering plate with different concentration distributions in the manufacturing process of the scattering plate. This requires highly advanced manufacturing process technology and increases the cost.

Additionally, since the transmittance distribution differs depending on the product specification, it is necessary to produce scattering plates with different transmittance distributions for respective types of products. This also leads to a higher cost.

In JP-A-2001-318614, two scattering plates are used, unlike an ordinary backlight which uses only one scattering plate. The configuration of JP-A-2001-318614 is higher in cost than that of the ordinary backlight.

As described above, improvement in the performance of a backlight such as use of a primary color LED for enhancement of color reproductivity or adoption of a partition structure intended to improve moving picture quality leads to an increase in thickness for elimination of non-uniformity in light emission or an increase in the cost of the backlight. In a backlight having light sources, the number of which is reduced for a lower cost, if the cost for eliminating non-uniformity in light emission increases, the effect of the reduction is lost.

BRIEF SUMMARY OF THE INVENTION

The present invention has an object of solving the above-described problems. More specifically, the object of the invention is to provide a high-performance backlight which can achieve high color reproductivity, high moving picture quality and the like or a backlight having a small number of light sources with less non-uniformity in light emission and at a low cost.

In order to achieve the above-described object, according to the invention, a lighting device for emitting light in a planar manner comprises a backlight section which has non-uniformity in light emission in a plane perpendicular to a main light emitting direction, and an optical film (or optical plate) which is arranged in the perpendicular plane and has an in-plane transmittance distribution compensating for the non-uniformity in light emission, wherein the optical film has a plurality of slits for allowing light to pass through and controls the in-plane transmittance distribution by varying shapes of the slit openings.

Widths of the slits are fixed, closed portions are provided in a longitudinal direction of the slits, and the in-plane transmittance distribution is controlled by the ratio of the closed portions to the slits. A part of the optical film other than the slits is composed of a light shielding layer which blocks light, a surface on a light source side of the light shielding layer is configured to reflect light, and the in-plane transmittance distribution of the optical film is distributed such that each of values in the distribution is smaller than a reciprocal of a corresponding value in a relative light intensity distribution of the backlight section without the optical film.

A surface opposite to the surface of the optical film in which the slits are formed has a cylindrical lens structure focused on the slits. A position of the backlight section is fixed relative to a position of the optical film. A liquid crystal display of the invention is characterized in that the lighting device is used as a backlight.

The lighting device according to the invention can eliminate non-uniformity in light emission at a low cost by controlling the in-plane transmittance distribution with the slits in the one surface of the optical film. When the lighting device is used as a liquid crystal display, it has less non-uniformity in light emission and can be provided at a low cost, while being a high-performance backlight which can achieve high moving picture quality.

Other objects, features and advantages of the invention will become apparent from the following description of the embodiments of the invention taken in conjunction with the accompanying drawings.

DETAILED DESCRIPTION OF THE INVENTION

Embodiments of the invention will be described below with reference to the drawings.

Figure 1:
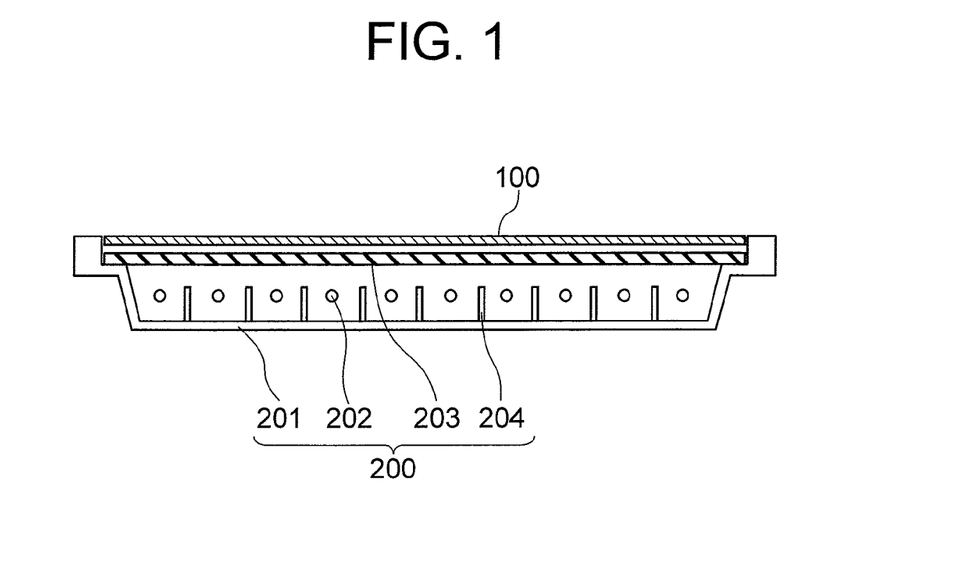
FIG. 1 is a sectional view of a lighting device according to the first embodiment of the invention.

FIG. 1 shows a sectional view of the lighting device according to the first embodiment of the invention. The lighting device of this embodiment is mainly comprised of a backlight section 200 and an optical film (or optical plate) 100. The backlight section 200 uses ten CCFLs 202 in a backlight frame 201. The CCFLs 202 can be controlled between a light emission state and a non-light emission state independently of each other. Optical partitions 204 are arranged between the CCFLs 202 to divide a light emission area into areas and limit leakage of light between the areas.

A light scattering plate 203 is arranged above the CCFLs 202 to be in contact with the backlight frame 201. The light scattering plate 203 scatters and reflects incident light, and part of the light is returned to the incident side.

Although not shown in FIG. 1, the inner surface of the backlight frame 201 is covered with a light scattering optical sheet with high reflectance. The optical partitions 204 are also covered with optical sheets of the same type.

With this configuration, light emitted from the CCFLs 202 diffuses while multiply scattering between the inner surface of the backlight frame 201 and the light scattering plate 203. After the light is made uniform to a certain degree, it is emitted from the light scattering plate 203 toward the optical film 100.

The optical partitions 204 are installed to improve the moving picture quality of the lighting device of this embodiment when the lighting device is used as a liquid crystal display. However, the arrangement of the optical partitions 204 causes non-uniformity in light emission at the light scattering plate 203 immediately above the optical partitions 204. The optical film 100 is arranged to eliminate the non-uniformity in light emission and to narrow the emitting direction of light spread by the light scattering plate 203.

Figure 2:
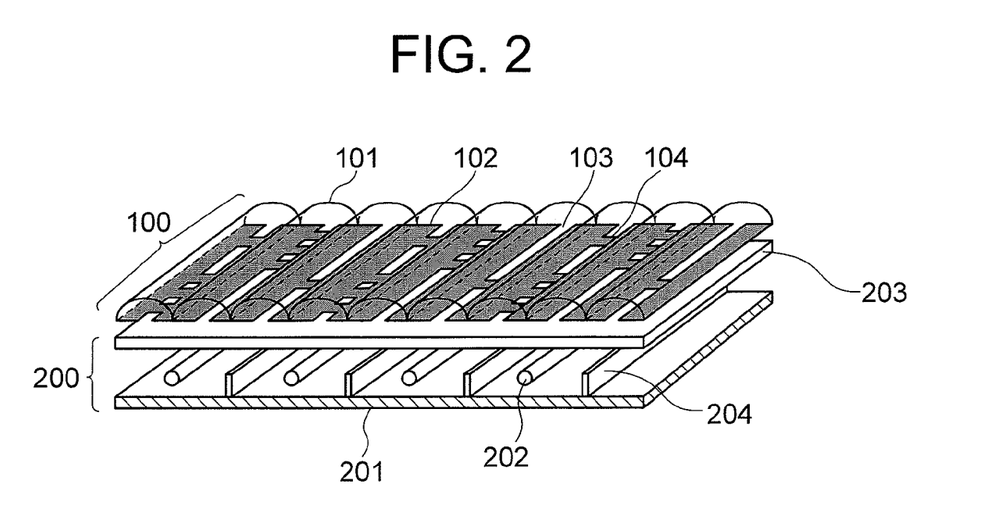
FIG. 2 is an overhead sectional view of the lighting device according to the first embodiment.

FIG. 2 shows an overhead sectional view of the lighting device of this embodiment. The backlight frame 201, CCFLs 202, light scattering plate 203, and optical partitions 204 are as explained above. To show the details of the optical film 100, cylindrical lenses 101, a light shielding layer 102, and slits 103 formed in the light shielding layer 102 are illustrated.

The focus of each cylindrical lens 101 is located almost at the corresponding slit 103. The combination of each cylindrical lens 101 and the corresponding slit 103 functions as a condensing film. Note that this embodiment does not require a light condensing ability nearly equal to that of collimated light and that each slit 103 has not a very small width only enough to cover the focal position of the corresponding cylindrical lens 101 but a moderately large width.

A surface on the light scattering plate 203 side of the light shielding layer 102 is configured to scatter and reflect light. Light which does not pass through the slits is returned to the backlight section 200 through the light scattering plate 203.

This embodiment is characterized in that closed portions 104 are provided in the slits 103. The in-plane transmittance distribution of the optical film 100 can be controlled by providing the closed portions 104 in the slits 103 and varying the frequency of occurrence of the closed portions 104. This allows compensating for non-uniformity in light emission on the light scattering plate 203.

This embodiment is further characterized in that each value in the in-plane transmittance distribution is set to be smaller than the reciprocal of a corresponding value in a light intensity distribution (non-uniformity in light emission) on the light scattering plate 203.

Figure 3:
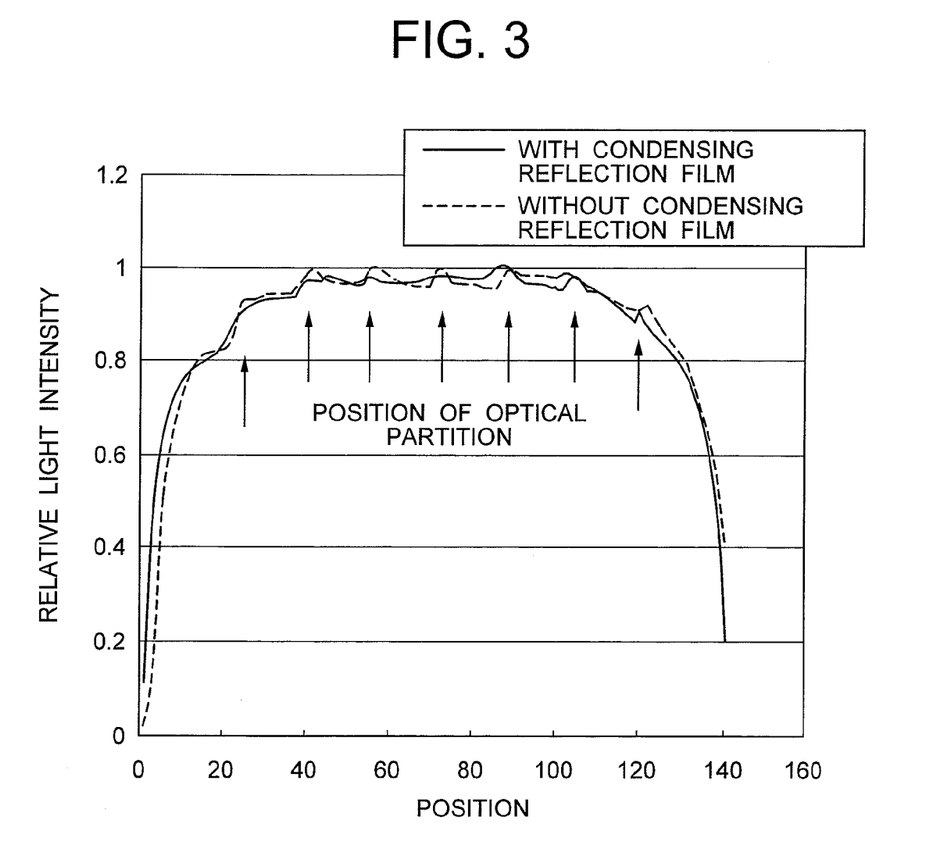
FIG. 3 is a graph showing non-uniformity in light emission on a light scattering plate according to the first embodiment.

This feature will be explained with reference to FIG. 3. FIG. 3 shows the results of measuring a light intensity distribution on the light scattering plate 203 in the backlight section 200 like that of this embodiment. The abscissa represents a position in a direction crossing the optical partitions 204 while the ordinate represents a relative light intensity. The backlight section 200 used in the measurement has sixteen CCFLs which can be independently controlled in groups of two. The light emission area is divided into eight areas, and therefore the optical partitions 204 are respectively provided at seven locations.

In FIG. 3, the positions of the optical partitions 204 are indicated by arrows. The figure shows that at the position of each partition, the relative light intensity extremely varies to cause non-uniformity in light emission.

Note that curves designated by the captions "WITH CONDENSING REFLECTION FILM" and "WITHOUT CONDENSING REFLECTION FILM" in FIG. 3 show the relative light intensity of a case where a condensing reflection film such as a prism sheet or polarizing reflection film used in a commercially available liquid crystal television or the like is arranged on the light scattering plate 203 and that of a case where no condensing reflection film is arranged, respectively.

It is apparent from FIG. 3 that although the condensing reflection film itself does not have an in-plane transmittance distribution, the case where the condensing reflection film is arranged has less non-uniformity in light emission than the case where no condensing reflection film is arranged.

It is conceivable that this is because light which is reflected by the condensing reflecting film and returned is scattered again in the backlight section 200 and made uniform. That is, when a film with a reflective property is used, non-uniformity in light emission is remedied even if the film does not have an in-plane transmittance distribution.

In the optical film 100 of this embodiment as well, since the light scattering plate 203 side of the light shielding layer 102 forming the slits 103 has light scattering and reflective properties, only the presence of the light shielding layer 102 remedies non-uniformity in light emission. If the optical film 100 is formed to have an in-plane transmittance distribution in which each value is the reciprocal of a corresponding value in the light intensity distribution (non-uniformity in light emission) on the light scattering plate 203, without regard to the remedial effect, non-uniformity in light emission may be caused in the reverse direction.

To ascertain the above, the optical film 100 having an in-plane transmittance distribution in which each value is the reciprocal of a corresponding value in the light intensity distribution (non-uniformity in light emission) on the light scattering plate 203, and the optical film 100 having an in-plane transmittance distribution smaller than that of the reciprocals were fabricated and visually checked. Although no non-uniformity in the reverse direction was found in the optical film 100 having the in-plane transmittance distribution equal to that of the reciprocals, the degree of non-uniformity seen through the optical film was lower in the optical film 100 having the in-plane transmittance distribution smaller than that of the reciprocals.

As described above, to effectively reduce non-uniformity in light emission in an optical film having a configuration as described in this embodiment, each value in the in-plane transmittance distribution needs to be smaller than the reciprocal of a corresponding value in the light intensity distribution (non-uniformity in light emission) on the light scattering plate 203.

Figure 4:
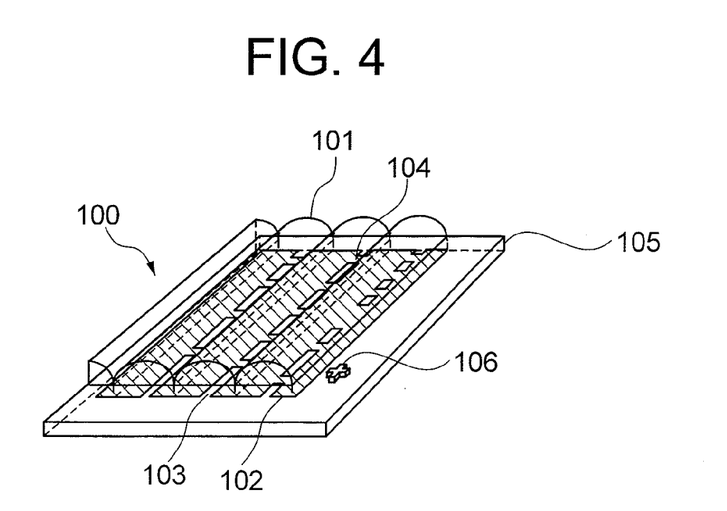
FIG. 4 is an overhead sectional view of an optical film according to the first embodiment.

A method for manufacturing the optical film 100 of this embodiment will be explained with reference to FIG. 4. FIG. 4 is an enlarged overhead view of the optical film 100.

The optical film 100 of this embodiment uses an optical film base material 105 as a base material, which is omitted in FIG. 2. The light shielding layer 102 and the slits 103 are arranged on the back of the base material, and the cylindrical lenses 101 are arranged on the front.

A method for fabricating the optical film is as follows. The cylindrical lenses 101 are first formed over the surface of the optical film base material 105, and then the back is coated with the light shielding layer 102. After that, the slits 103 and the closed portions 104 in the slits are simultaneously patterned.

At the time of fabricating the cylindrical lenses 101, an alignment mark 106 is formed to allow the slits 103 to be aligned with the focal positions of the cylindrical lenses 101 later.

This makes it possible to easily align the slits 103 with the focal positions of the cylindrical lenses 101 when patterning the slits 103 and closed portions 104 later.

Figure 5:
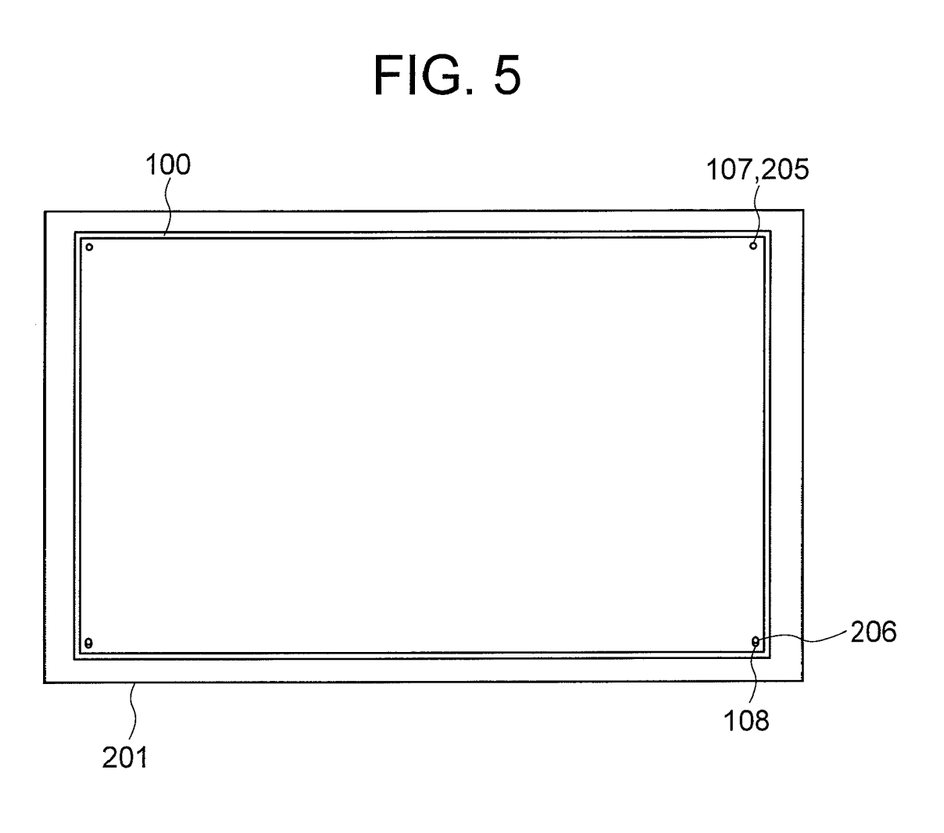
FIG. 5 is a view of the lighting device according to the first embodiment as viewed from above.
Figure 6:
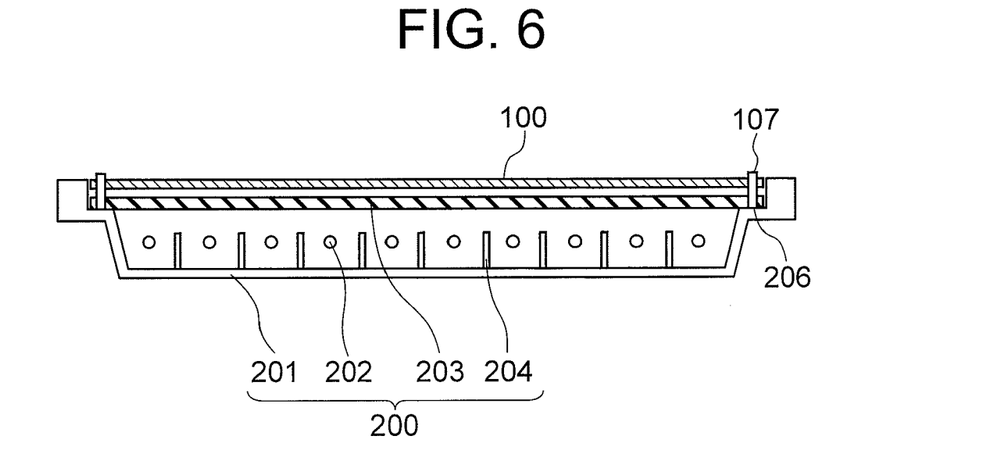
FIG. 6 is a sectional view of a part of the lighting device according to the first embodiment.

Connection of the optical film 100 and the backlight section 200 will be explained with reference to the FIGS. 5 and 6. FIG. 5 is a view of the lighting device of this embodiment as viewed from above, and FIG. 6 is a sectional view of a part of the device.

As shown in FIG. 5, the optical film 100 is arranged such that the whole of the optical film fits in a recess formed in the backlight frame 201. The recess in the backlight frame 201 is slightly larger than the optical film 100, and the light scattering plate 203 is arranged immediately below the optical film 100. The reason why making the recess slightly larger is because of preventing the optical film 100 or light scattering plate 203 from protruding from the backlight frame 201 even if their sizes vary due to a difference in thermal expansion coefficient between them.

To be noted here is that the optical film 100 has the in-plane transmittance distribution and that it has to be arranged at a position corresponding to non-uniformity in light emission on the light scattering plate 203. In consideration of this, this embodiment is characterized in that holes are formed at four corners of the optical film 100 and light scattering plate 203 and that projections are provided at positions corresponding to the holes on the backlight frame 201.

This embodiment is also characterized in that the holes are formed in consideration of a difference in thermal expansion coefficient. More specifically, the holes 107 which are located on the upper side when the lighting device is vertically installed and used have a circular shape. The holes 108 which are located on the lower side have a vertically long elliptical shape.

Figure 7:
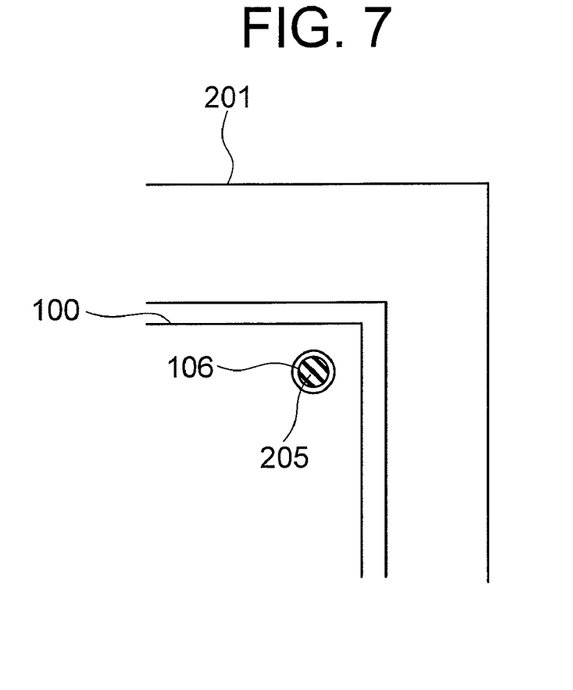
FIG. 7 is an enlarged view of an upper circular hole and an upper holding section of the lighting device according to the first embodiment.
Figure 8:
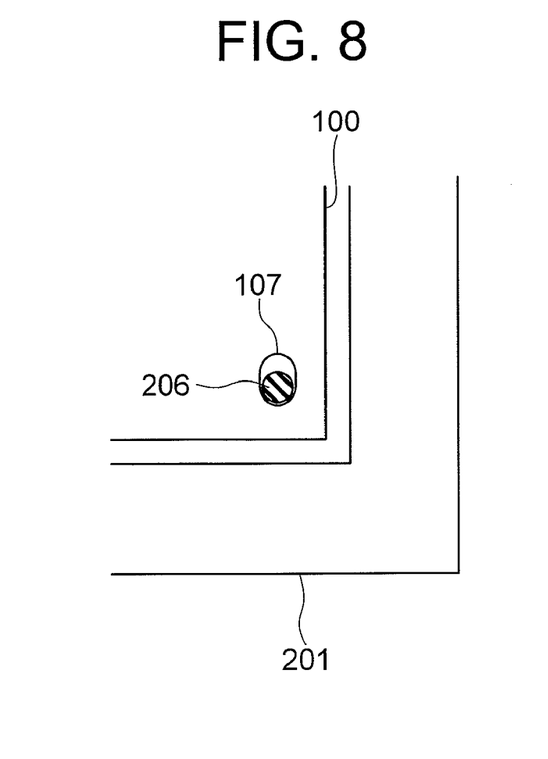
FIG. 8 is an enlarged view of a lower elliptical hole and a lower holding section of the lighting device according to the first embodiment.

The projections (holding portions for the holes) provided on the backlight frame 201, both the upper holding portions 205 and the lower holding portions 206, have a circular shape. FIGS. 7 and 8 show enlarged views of the upper circular holes 107, upper holding portions 205, lower elliptical holes 108, and lower holding portions 206.

With this structure, the backlight section 200 including the optical film 100 and light scattering plate 203 can effectively compensate for non-uniformity in light emission because their positions are fixed with tolerance of differences in thermal expansion coefficient.

As described above, the method for manufacturing the optical film 100 of this embodiment is not complicated, and the number of sheets used in this embodiment is reduced as compared with the case of using a plurality of optical sheets including a prism sheet as is in a commercially available liquid crystal television. This allows reducing the cost.

Further, as for the light scattering plate 203, used is only one entirely uniform light scattering plate that is commonly used. Accordingly, in this embodiment, even the optical partition structure is added to improve moving picture quality, non-uniformity in light emission in the backlight can be reduced without increasing the cost.

In this embodiment, the cylindrical lenses 101 on the front of the optical film 100 and the light shielding layer 102 and slits 103 on the back are manufactured by coating film formation and patterning. However, they may be formed by printing or ink-jet technology. In this case, the production cost will be further reduced, and it will be possible to reduce non-uniformity in light emission at a further lower cost. Although the CCFLs 202 are used as the light sources in this embodiment, LEDs may be used as the light sources instead.

Figure 9:
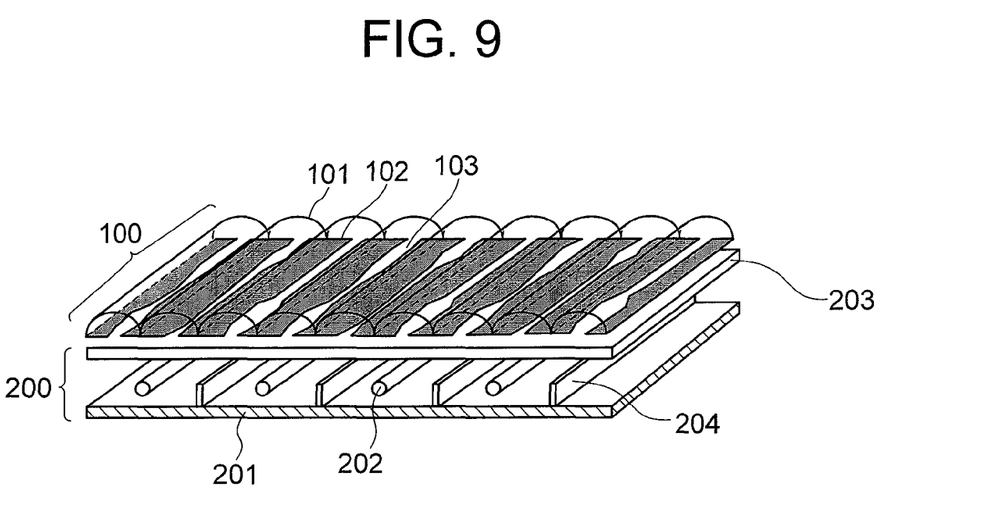
FIG. 9 is an overhead sectional view of a lighting device according to the second embodiment of the invention.

The second embodiment of the invention is the same as the first embodiment except the following. In the lighting device according to this embodiment, the in-plane transmittance distribution of the optical film 100 is controlled not by providing closed portions 104 in the slits 103 but by varying the widths of the slits 103.

FIG. 9 shows an overhead sectional view of the lighting device of this embodiment. It is possible to control the in-plane transmittance distribution by varying the width of each slit 103 from one point to another. This method, which varies the widths of the slits 103, has an advantage over the method of providing the closed portions in the slits 103 in that it can more finely vary the transmittance from one point to another of each slit. This allows compensating for non-uniformity in light emission on the light scattering plate 203 with high accuracy.

As described above, the optical film 100 of this embodiment is manufactured in the same manner as in the first embodiment, and the number of the optical film 100 used in this embodiment is the same as that in the first embodiment. Accordingly, the cost can be reduced, and non-uniformity in light emission can be compensated for with higher accuracy.

Figure 10:
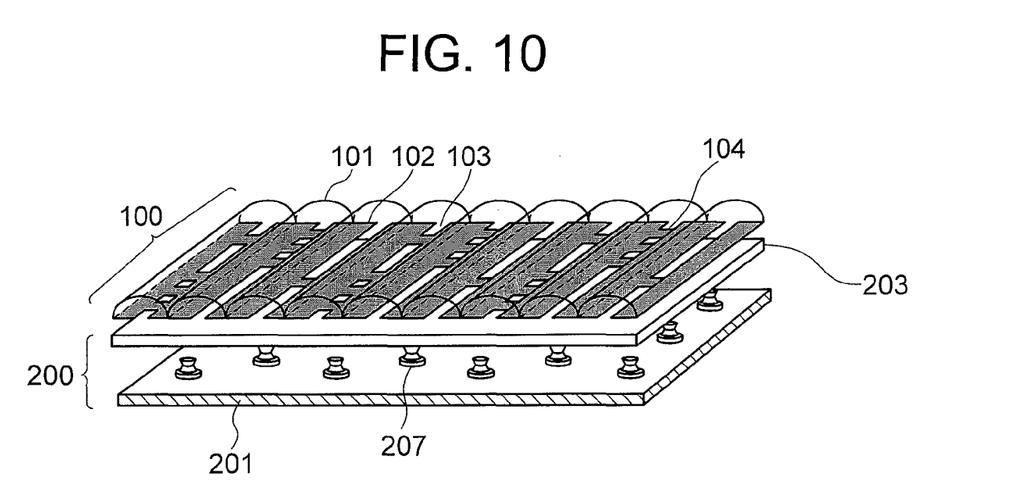
FIG. 10 is an overhead sectional view of a lighting device according to the third embodiment of the invention.

The third embodiment of the invention is the same as the first embodiment except the following. FIG. 10 shows an overhead sectional view of the lighting device according to this embodiment. This embodiment has a configuration in which LEDs 207, which are a point light source, are arranged as an illuminant of the backlight section 200 immediately below the light scattering plate 203. A partition structure for improving moving picture quality is not introduced into this embodiment. The LEDs 207 are so-called RGB primary color-type LEDs, each of which has one of the RGB primary colors, and use of the lighting device of this embodiment in a liquid crystal display makes it possible to make the color reproductivity higher as compared with CCFLs.

The LEDs 207 used in this embodiment are configured not to emit light immediately upward but to emit light mainly in a planar direction in the back light. With this configuration, light is scattered and made uniform in the backlight section 200. However, variations in light emission intensity between the LEDs 207 and the light emission intensity distribution of each LED 207 as the point light source cause a high degree of non-uniformity in light emission on the light scattering plate 203.

This embodiment compensates for the non-uniformity in light emission with the optical film 100 as in the first embodiment, but a method for manufacturing the optical film is different from that in the first embodiment.

Figure 11:
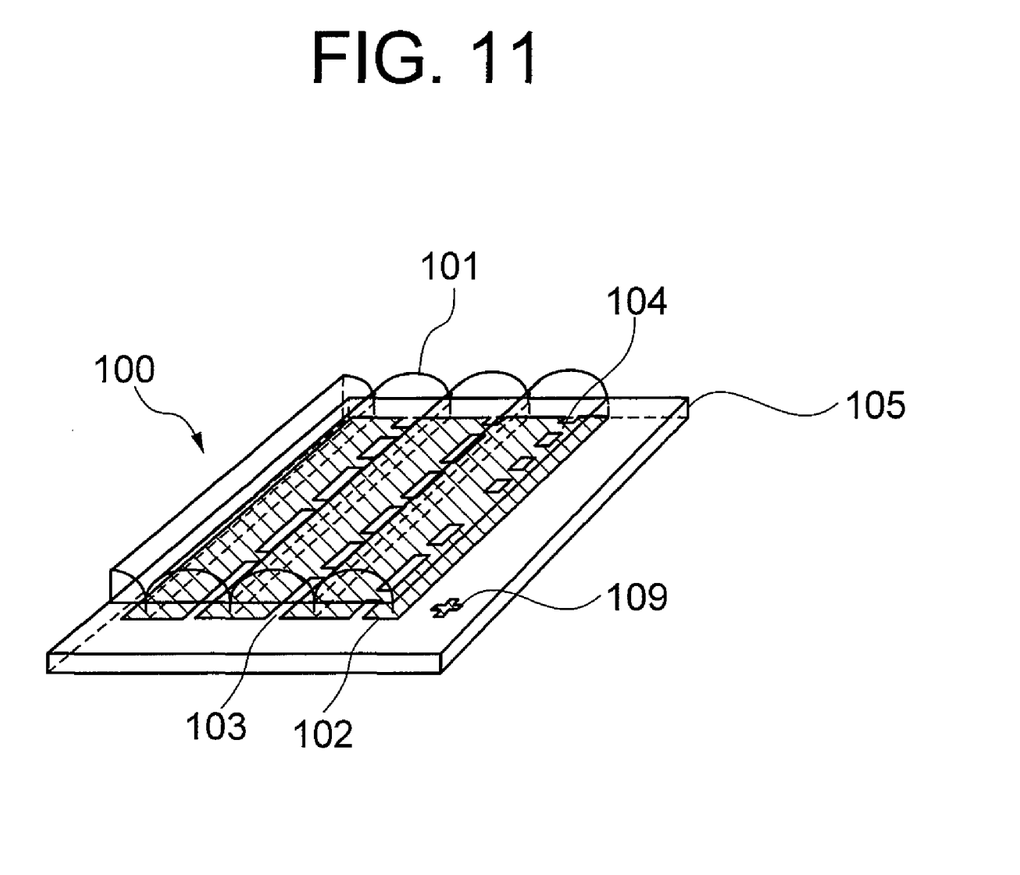
FIG. 11 is an overhead sectional view of an optical film according to the third embodiment.

The method for manufacturing the optical film 100 of this embodiment will be explained with reference to FIG. 11. FIG. 11 is an enlarged overhead view of the optical film 100 of this embodiment.

The method for fabricating is as follows. Contrary to the first embodiment, the entire back of the optical film base material 105 is first coated with the light shielding layer 102. After that, the slits 103 and the closed portions 104 in the slits 103 are simultaneously patterned. At the time of patterning, an alignment mark 109 is also patterned for aligning the focal positions of the cylindrical lenses 101 with the slits 103 when fabricating the cylindrical lenses 101.

After that, the cylindrical lenses 101 are formed on the front of the optical film base material 105 using the alignment mark 109 for the cylindrical lenses. In this manner, the focal positions of the cylindrical lenses 101 can easily be aligned with the slits 103.

As described above, the patterning accuracy of the light shielding layer 102 and the formation accuracy of the cylindrical lenses 101 can be made higher in the present embodiment wherein the flat light shielding layer 102 on the back of the optical film base material 105 is first patterned, as compared with the case where the uneven cylindrical lenses 101 are first formed. For this reason, this embodiment can compensate for non-uniformity in light emission with higher accuracy than the first embodiment.

Figure 12:
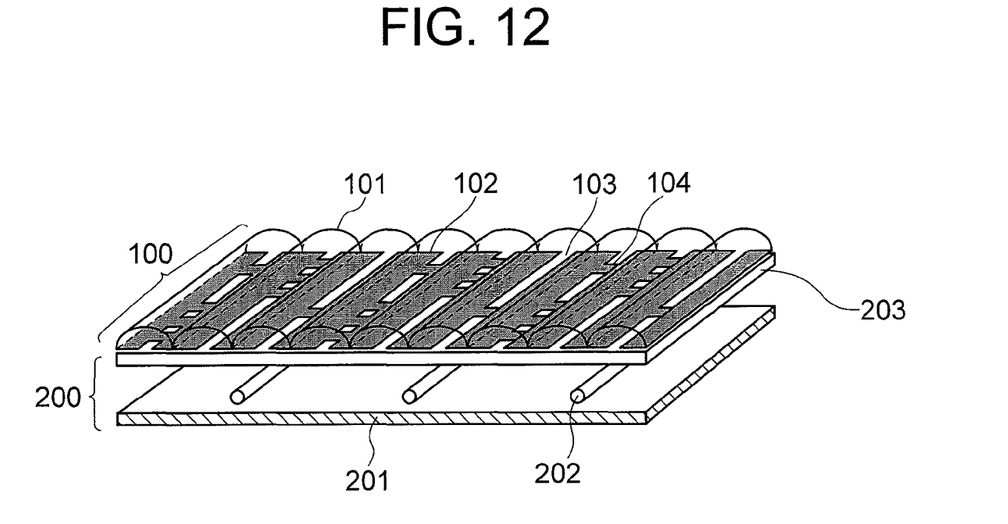
FIG. 12 is an overhead sectional view of a lighting device according to the fourth embodiment of the invention.

The fourth embodiment of the invention is the same as the first embodiment except the following. FIG. 12 shows an overhead sectional view of the lighting device according to this embodiment. A partition structure for improving moving picture quality is not introduced into this embodiment. The number of CCFLs 202 used is made smaller than that in the first embodiment for the purpose of reducing the cost. This embodiment uses the eight CCFLs 202.

Even in this case, it is possible to provide the lighting device with less non-uniformity in light emission on the whole at a very low cost only by controlling the in-plane transmittance distribution of the optical film 100 to compensate for the non-uniformity in light emission on the light scattering plate 203.

Figure 13:
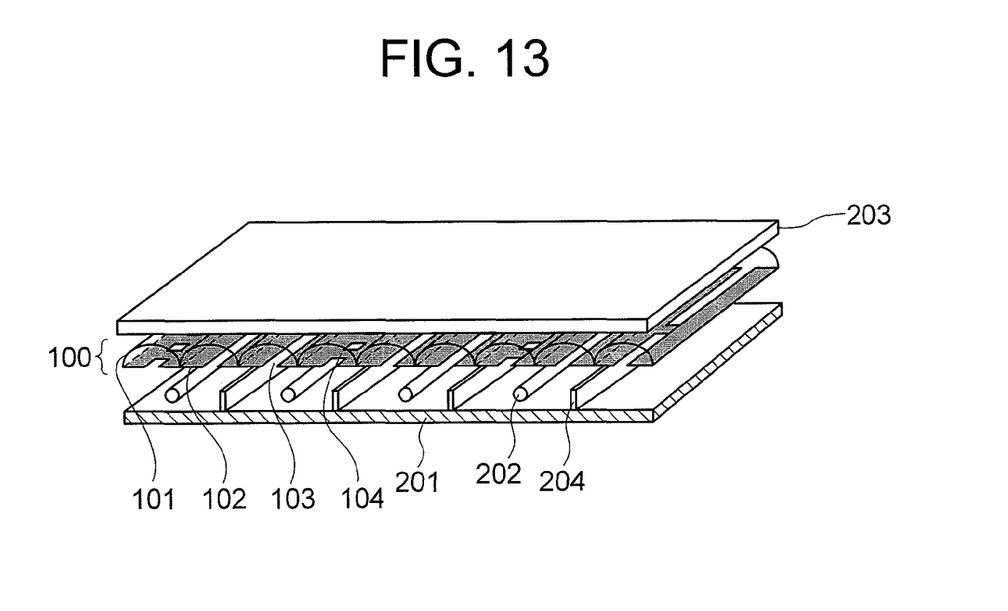
FIG. 13 is an overhead sectional view of a lighting device according to the fifth embodiment of the invention.

The fifth embodiment of the invention is the same as the first embodiment except the following. FIG. 13 shows an overhead sectional view of the lighting device according to this embodiment. This embodiment is characterized in that the optical film 100 is located below the light scattering plate 203 (on a CCFL light source side) and that the light scattering property of the light scattering plate 203 is lower than that in the first embodiment.

When the optical film 100 is located below the light scattering plate 203, the light condensing property of the optical film 100 can securely control the emitting directions of light from the respective areas of the backlight section, leakage of light between the areas can be further reduced. Further, as the light scattering property of the light scattering plate 203 is made lower owing to the effect of reducing non-uniformity in light emission of the optical film, the transmission property can be improved, and efficiency for light utilization can be improved.

This makes it possible to further improve moving picture quality when the lighting device of this embodiment is used in a liquid crystal display and reduce power consumption.

Figure 14:
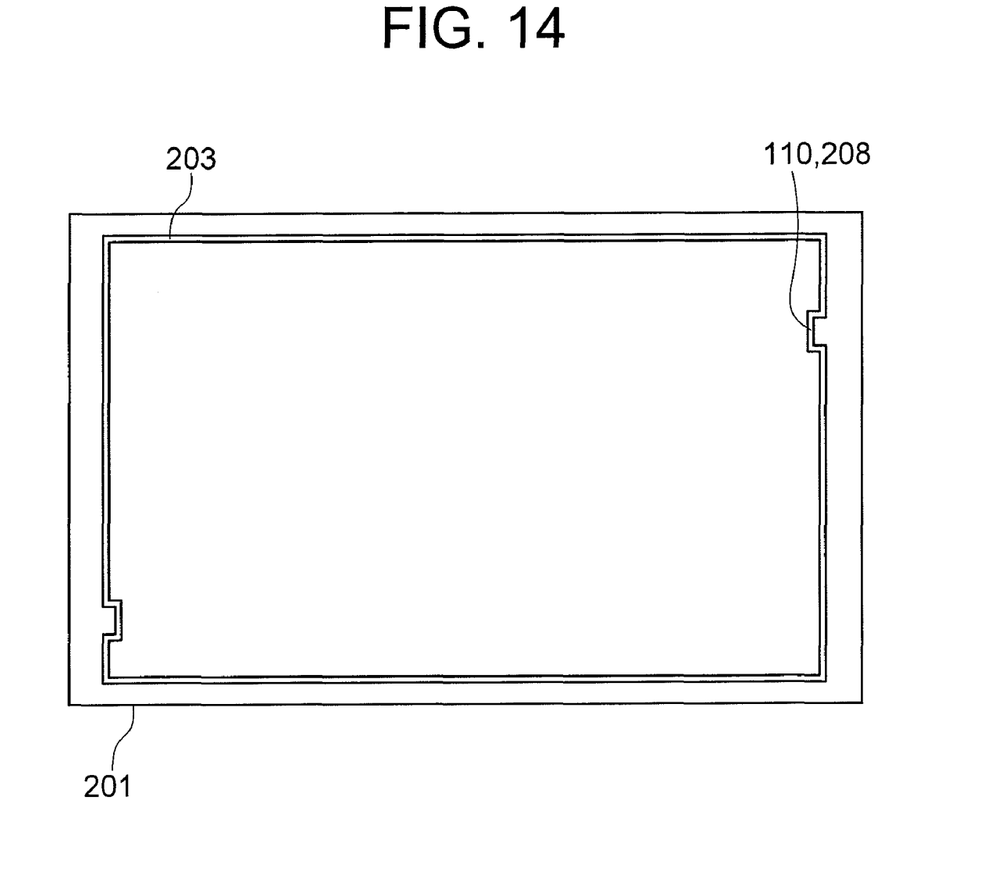
FIG. 14 is a view of the lighting device according to the fifth embodiment as viewed from above.
Figure 15:
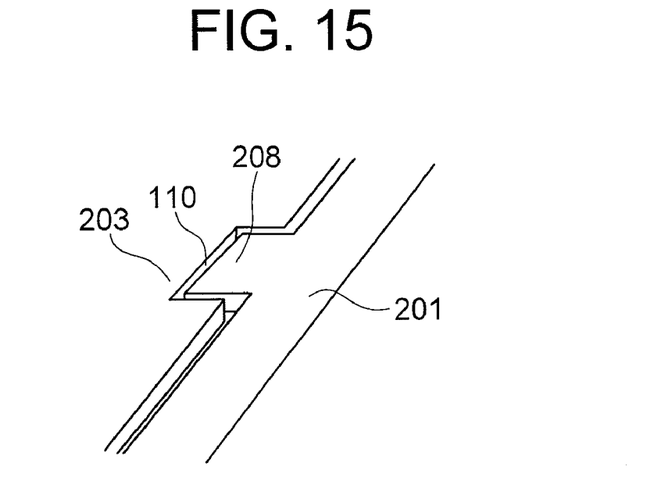
FIG. 15 is an overhead view of a part of the lighting device according to the fifth embodiment.

Connection of the optical film and the backlight section in this embodiment will be explained with reference to FIGS. 14 and 15. FIG. 14 is a view of the light device of this embodiment as viewed from above, and FIG. 15 is an overhead view of a part of the lighting device.

As shown in FIG. 14, the light scattering plate 203 is arranged such that the whole of the light scattering plate fits in the recess formed in the backlight frame 201, and the optical film is arranged below the light scattering plate 203. The recess in the backlight frame 201 is slightly larger than the light scattering plate 203 and optical film. The reason why making the recess slightly larger is because of preventing the optical film or light scattering plate 203 from protruding from the backlight frame 201 even if their sizes vary due to a difference in thermal expansion coefficient between them.

Similarly to the first embodiment, the optical film has the in-plane transmittance distribution and thus it needs to be arranged at a position corresponding to non-uniformity in light emission which may occur immediately below the optical film. In consideration of this, this embodiment is characterized in that cutouts 110 are provided in end faces of the optical film and light scattering plate 203 and that frame projections 208 are provided on the backlight frame 201 at positions corresponding to the cutouts.

The cutouts 110 are also formed in consideration of a difference in thermal expansion coefficient. More specifically, the cutouts 110 of the optical film 100 and light scattering plate 203 are made slightly larger than the projections 208 of the backlight frame 201. FIG. 15 shows an enlarged view of the cutout 110 and the corresponding frame projection 208.

Figure 16:
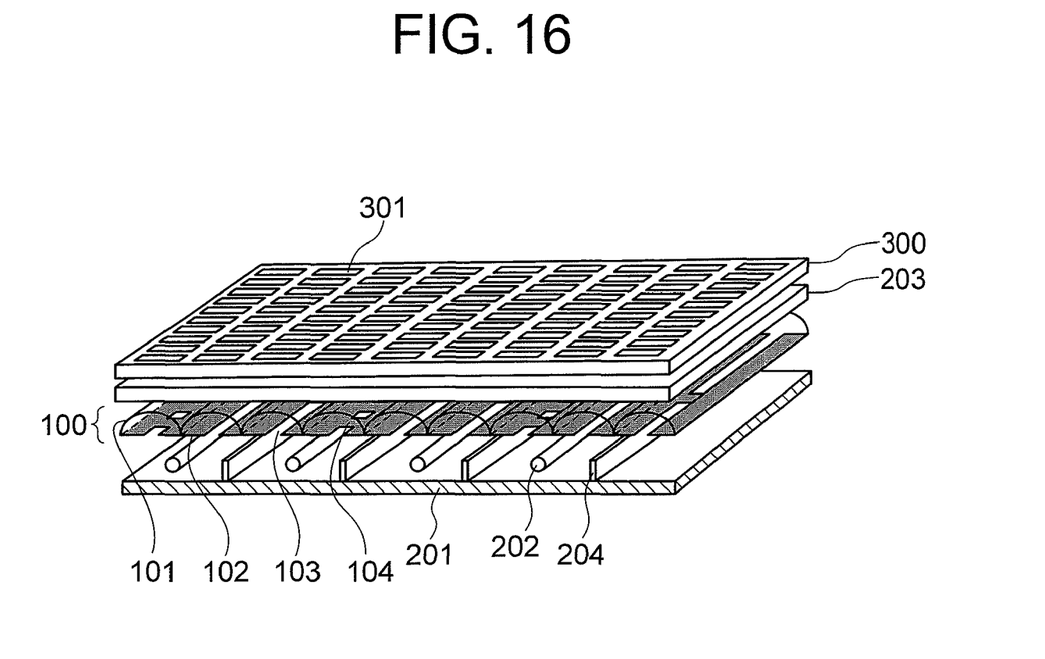
FIG. 16 is an overhead sectional view of a liquid crystal display according to the sixth embodiment of the invention.
Figure 17:
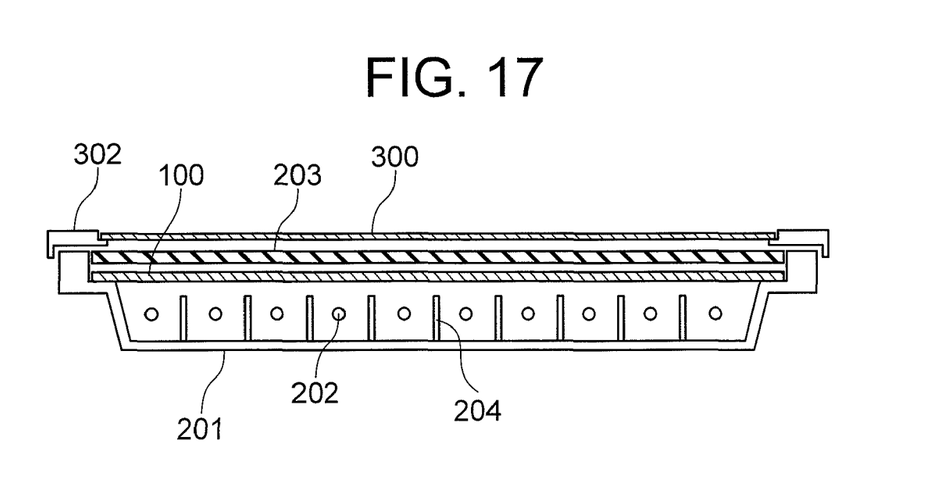
FIG. 17 is a sectional view of the liquid crystal display according to the sixth embodiment of the invention.

FIG. 16 shows an overhead sectional view of the liquid crystal display according to the sixth embodiment of the invention, and FIG. 17 shows a sectional view of the display. This embodiment is the liquid crystal display which uses the lighting device of the fifth embodiment as a backlight. A liquid crystal display section 300 is arranged on a liquid crystal holding frame 302, which is located on the backlight frame 201, and displays a video picture while controlling light from the light scattering plate 203.

This embodiment is characterized in that periodic distances between pixels 301 in the liquid crystal display section 300 are almost equal to those between the cylindrical lenses 101 of the optical film 100.

Generally, if an object having an optical periodic structure is overlaid on an object having almost the same optical periodic structure like the optical film 100 and the objects are vertically observed, a phenomenon called a moire occurs. The moire is a pattern of undulations formed by the two upper and lower optical periodic structures and is observed as a striped pattern. To eliminate the moire phenomenon, the period of one of the two periodic optical structures needs to be made about three or more times that of the other. Alternatively, the period of each periodic optical structure may be made irregular.

In the case of a liquid crystal display like this embodiment, pitches between pixels for video picture display cannot be made irregular. Accordingly, it is necessary to make the intervals of the cylindrical lens 101 of the optical film 100 irregular or three or more times those of the pixels in the liquid crystal display section.

In the optical film 100 of the first to fourth embodiments, the period of the cylindrical lenses 101 is set to be about three times that of the pixels in a general liquid crystal display.

However, when the light scattering plate 203 is interposed between the optical film 100 and the liquid crystal display section 300 like the configuration of this embodiment, the light scattering plate 203 can eliminate the optical periodicity of the cylindrical lenses 101. Accordingly, the period characteristic of the cylindrical lens 101 can be made about equal to or lower than that of the pixel structure.

The cylindrical lenses 101 can have a rougher structure, the accuracy in the manufacturing process can be therefore reduced, and the production speed can be increased. In other words, the quantity of production can be increased by means of the same device, and the cost can be further reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lighting device for emitting light in a planar manner, comprising:
  a backlight section having non-uniformity in light emission in a plane perpendicular to a main light emitting direction; and
  an optical film arranged on the perpendicular plane and having an in-plane transmittance distribution which compensates for the non-uniformity in light emission;
  wherein said optical film has a plurality of slits which allow light to pass through and controls the in-plane transmittance distribution by varying shapes of openings of the slits; and wherein a part of said optical film other than the slits is composed of a light shielding layer which blocks light, a surface on a light source side of the light shielding layer is configured to reflect light, and the in-plane transmittance distribution of said optical film is set such that each of values in the in-plate transmittance distribution is smaller than a reciprocal of a corresponding value in a relative light intensity distribution of the backlight section.

2. The lighting device according to claim 1, wherein widths of said slits are fixed, closed portions are provided in a longitudinal direction of the slits, and the in-plane transmittance distribution is controlled by a ratio of the closed portions to the slits.

3. The lighting device according to claim 1, wherein the in-plane transmittance distribution is controlled by varying the widths of said slits.

4. The lighting device according to claim 1, wherein a surface opposite to a surface of said optical film in which the slits are formed has a cylindrical lens structure focused on the slits.

5. The lighting device according to claim 4, wherein an alignment mark for alignment with the slits when manufacturing the cylindrical lens structure is present on the light shielding layer of the optical film, in which the slits are formed.

6. The lighting device according to claim 4, wherein an alignment mark for alignment with the cylindrical structure when forming the slits in the light shielding layer is present on a layer of a the optical film, which is the same with the cylindrical lens structure.

7. The lighting device according to claim 1, wherein said backlight section is a plane illuminant which uses a LED as a light source.

8. The lighting device according to claim 1, wherein the backlight section is a plane illuminant which uses a CCFL as a light source.

9. The lighting device according to claim 1, wherein said backlight section can control a quantity of light for each of a plurality of areas, and members for controlling the quantity of light are present at boundaries between the areas for limiting leakage of light between the areas.

10. The lighting device according to claim 1, wherein said backlight section uses a light scattering plate on a light emitting surface, and said optical film is arranged on a light emitting side of the light scattering plate.

11. The lighting device according to claim 1, wherein said backlight section uses a light scattering plate on a light emitting surface, and said optical film is arranged on a light incident side of the light scattering plate.

12. The lighting device according to claim 1, further comprising means for fixing a position of the optical film with respect to a position of the backlight section.

13. The lighting device according to claim 12, wherein said means for fixing the position of the optical film is comprised of holes at four corners of the optical film and projections on the backlight section.

14. The lighting device according to claim 13, wherein ones of said holes at the four corners of the optical film, which are located on an upper side when the lighting device is vertically installed, are substantially as large as the projections on the backlight section, and the other holes, which are located on a lower side when the lighting device is vertically installed, are larger than the projections on the backlight section and are elongated particularly in a vertical direction.

15. The lighting device according to claim 12, wherein said means for fixing the position of the optical film is comprised of cutouts at ends of the optical film and projections on the backlight section.

16. A liquid crystal display comprising the lighting device according to claim 1, and a liquid crystal display section arranged on a light emitting surface of the lighting device.

17. A liquid crystal display comprising the lighting device according to claim 11, and a liquid crystal display section arranged on a light emitting surface of the lighting device, wherein the slits of the optical film are arranged at equal intervals, and the intervals are almost equal to intervals between pixels of the liquid crystal display section.

* * * * *